United States Patent [19]
Bondeson et al.

[11] Patent Number: 5,662,243
[45] Date of Patent: Sep. 2, 1997

[54] MELTING APPARATUS WITH MATERIAL RELEASE SENSING SYSTEM

[75] Inventors: Benjamin J. Bondeson, Buford; Paul S. Frates, Lawrenceville, both of Ga.; John E. Jackson, Moreland Hills, Ohio

[73] Assignee: Nordson Corporation, Westlake, Ohio

[21] Appl. No.: 539,085

[22] Filed: Oct. 4, 1995

[51] Int. Cl.$^6$ ..................................................... B67D 5/62
[52] U.S. Cl. ........................... 222/1; 219/421; 222/23; 222/54; 222/77; 222/146.5; 222/325
[58] Field of Search ............................ 222/1, 23, 41, 222/45, 54, 77, 146.1, 146.5, 325; 219/421

[56] References Cited

U.S. PATENT DOCUMENTS

| | | | |
|---|---|---|---|
| 2,544,661 | 3/1951 | Fossa | 222/146.5 X |
| 2,665,823 | 1/1954 | Fossa | 222/146.5 X |
| 2,686,109 | 8/1954 | Moule | 219/421 |
| 2,851,577 | 9/1958 | Bolds et al. | |
| 2,987,599 | 6/1961 | Voss | |
| 3,352,279 | 11/1967 | Lockwood | 219/421 |
| 3,377,466 | 4/1968 | Paulsen | 219/421 |
| 3,876,105 | 4/1975 | Kelling | 219/421 X |
| 3,952,921 | 4/1976 | Tanner | 222/146.5 |
| 4,024,854 | 5/1977 | Park et al. | 222/325 X |
| 4,308,447 | 12/1981 | Nötzold et al. | 222/146.5 |
| 4,505,669 | 3/1985 | Rogers | 222/146.5 X |
| 4,667,850 | 5/1987 | Scholl et al. | 222/23 |
| 4,724,983 | 2/1988 | Claassen | 222/146.5 |
| 4,811,863 | 3/1989 | Claassen | 222/146.5 |
| 4,821,922 | 4/1989 | Miller et al. | 222/77 |
| 4,848,420 | 7/1989 | Claassen | 222/146.5 X |
| 4,883,200 | 11/1989 | Miller et al. | 222/77 |
| 4,898,527 | 2/1990 | Claassen | |
| 4,907,629 | 3/1990 | Claassen | 222/146.5 X |
| 4,919,308 | 4/1990 | Majkrzak | 222/146.5 |
| 5,026,969 | 6/1991 | Knepler et al. | 222/146.5 X |

FOREIGN PATENT DOCUMENTS

| | | |
|---|---|---|
| 953733 | 4/1964 | United Kingdom . |

OTHER PUBLICATIONS

Brochure, "Hot–Melt Processors", May Coating Technologies, Inc., 2280 Terminal Road, St. Paul, MN 55113.

Brochure, "200/400 Series Hot–Melt Drum Unloaders", May Coating Technologies Inc., 2280 Terminal Road, St. Paul, MN 55113.

Sta–Warm Brochure, "Coated Fabric", Sta–Warm Electric Company, Inc., North Chestnut Street, Ravenna, Ohio 44266, PB #7.

Sta–Warm Brochure, "Glue Melting Equipment", Sta–Warm Electric Company, Inc., North Chestnut St., Ravenna, Ohio 44266, G–8.

Sta–Warm Brochure, "Aid Plastic Coated Pipe Production", Sta–Warm Electric Company, Inc., North Chestnut St., Ravenna, Ohio 44266, Republic Steel Inst.

Sta–Warm Brochure, "Aid Plastic Coated Pipe Production", Sta–Warm Electric Company, Inc., North Chestnut St., Ravenna, Ohio 44266, Hill–Hubbell Inst.

Drawing, "Hot Melt Adhesive Tank", Sta–Warm Electric Company, Inc., North Chestnut Street, Ravenna, Ohio 44266.

Drawing, Sta–Warm AD 32 55 Compound Melter #34C21570, Jan. 1964.

Drawing, Sta–Warm Dwios Drum, Warmer, #34B27840 2/2, Oct., 1969.

*Primary Examiner*—Kevin P. Shaver
*Attorney, Agent, or Firm*—Wood, Herron & Evans, L.L.P.

[57] ABSTRACT

An apparatus for use in supplying thermoplastic material such as hot melt adhesive from containers includes an apparatus for detecting and indicating when thermoplastic material or adhesive has moved out the container such that the container may be removed from the apparatus. Both force responsive and temperature responsive indicators are disclosed, along with various signalling devices, to inform an operator when the container may be removed leaving the material within the apparatus.

22 Claims, 6 Drawing Sheets

MELTING APPARATUS WITH MATERIAL RELEASE SENSING SYSTEM

FIELD OF THE INVENTION

This invention generally relates to thermoplastic material melting and dispensing technology and, more specifically, to hopper type melting apparatus used for melting and dispensing so-called hot melt adhesives.

BACKGROUND OF THE INVENTION

Adhesive materials which are melted and liquified just prior to their application on a substrate are referred to as "hot melt" adhesives. Hot melt adhesives are available in bulk, in such forms as chicklets, pellets, slats and bricks and are also available in the form of a slug held in a container, such as a can, pail, or drum. A drum of bulk adhesive material may be as large as a conventional 55 gallon drum for large scale applications. The present invention is directed at solving various problems encountered with melting materials such as hot melt adhesives.

Often, hopper-type dispensers are used in the liquifying of hot melt adhesives. In the case of hot melt adhesive supplied as a slug in a container, it is desirous to cause the slug of adhesive to be removed from the container so that it may be efficiently melted when it comes in contact with a heated melting grid at the bottom of the hopper. A heated reservoir disposed beneath the melting grid receives the melted or liquified hot melt adhesive as it passes through the grid and maintains it in a heated liquid state. An outlet of the reservoir typically leads to a pump for pumping the liquid hot melt adhesive to other equipment, such as apparatus for applying material to substrates.

Prior hopper-type dispensers typically have one or more heaters disposed about the hopper. The heater or heaters may be attached to the side wall of the hopper to heat a container supported therein. To loosen a slug of adhesive from a container, adhesive along the inside surfaces of the container walls must be softened or melted to the extent that gravitational force on the adhesive slug can overcome the adhesive or frictional forces which tend to bind the adhesive to the walls and bottom of the container. When sufficient heating has occurred, the slug of adhesive will break loose from the walls of the drum, slide out of the drum and come into contact with the melting grid where the adhesive slug can be divided up into small portions and efficiently melted.

After the slug of hot melt adhesive has moved downward and partially out of the container such that a lower end thereof rests on the melting grid, it is generally desirable to remove the container from the hopper. In some cases, if the container is not promptly removed from the hopper, the molten hot melt adhesive may flow upward between the outside surface of the container and the hopper. This backed up hot melt adhesive sticks to the outside of the container and impedes handling and disposal of the container. In present hot melt adhesive systems, it is difficult to detect when the hot melt adhesive has moved out of the container opening onto the melting grid.

U.S. Pat. No. 4,919,308 issued in the name of Majkrzak discloses one known adhesive melting device and recognizes the problem of having liquid adhesive back up around the sides of the drum or container. However, the Majkrzak patent merely states that heat should be applied such that the hot melt material is released within fifteen to twenty minutes. The Majkrzak patent fails to disclose any sure manner of informing the operator that the material has in fact been released such that the container may be removed to prevent adhesive back up around the container.

U.S. Pat. No. 2,544,661 issued in the name of Fossa discloses another earlier adhesive melting device which includes adjacent adhesive chambers. One chamber holds a container of adhesive and melts the adhesive from the container, while the adjacent chamber holds a quantity of adhesive and dispenses that adhesive as necessary. The adjacent chamber includes a float which indicates the level of adhesive therein and includes a collar which indicates when the supply of adhesive within the container has been completely exhausted. This system, however, apparently only detects when the adhesive in the container has been completely exhausted from the container.

Accordingly, there is a need for a device and method for more precisely detecting when thermoplastic material, such as a slug of hot melt adhesive, has initially moved out of a heated container so that the container may be removed from the device. This detection would also provide a way to initiate desired control actions which depend on the initial movement of the material from the container.

SUMMARY OF THE INVENTION

In accordance with the present invention, a detection system is provided for a melting apparatus which signals when material within a container placed in the hopper has moved through an open end thereof such that the container may be removed from the hopper. Various embodiments of a detection system are contemplated in accordance with the present invention. In a first embodiment, the container is mounted within the hopper in such a manner that a reduction in the weight of the container, resulting from material leaving the container, is detected by a force responsive element. In a second embodiment, the hopper is mounted on a force responsive element, such as a load cell, which detects the weight of material bearing on a melting grid at the bottom of the hopper after the material has moved through the open end of the container. The third embodiment utilizes at least one temperature or energy sensor for detecting a drop in temperature or an increase in power or energy when the material in the container moves into the lower portion of the hopper.

In the first embodiment, a container holding a slug of thermoplastic material, such as hot melt adhesive, is suspended by a support which is operatively connected to a force responsive element or device for indicating when the weight of the container has been reduced by material leaving the container. Specifically, the container is suspended at the upper end of the hopper by an annular flange. The force responsive element or device may include at least one spring which supports the weight of the container by being disposed between the annular flange and a support surface which may be part of the hopper. The spring is preferably a compression spring which expands when the weight of the container is reduced by at least a portion of the hot melt adhesive moving out the open end of the container into the lower end of the hopper. The spring is operatively connected to a operator perceptible signal device which may simply be a pointer on a scale in this first embodiment for indicating to the operator that the container may be removed. Alternatively, the force responsive element may be a load cell which essentially performs the same indicating function as the spring.

In accordance with a second embodiment of this invention, the hopper may include a material support in a lower portion thereof which is operatively connected to a force responsive element or device. The force responsive element or device in this embodiment may be a spring or a load cell as in the first embodiment. However, in this second embodiment, the force responsive element or device detects the increase in load on the material support when material from within the container falls through the open end of the container onto the material support.

More specifically, in the second embodiment the container of material is supported separately from the hopper, such as by a separate housing, and the hopper includes the material support, which may be a melting grid in a lower material receiving portion of the hopper. A force responsive element is positioned between a base of the housing and a lower end of the hopper to detect an increase in the weight of the hopper which results when material has moved from the container onto the material support of the hopper. Preferably, the lower end of the hopper is pivotally mounted to the base of the housing. As in the first embodiment, the force responsive element may be a spring, load cell, or the like.

In the third embodiment, a temperature sensor is disposed within the lower material receiving portion of the hopper and produces an output signal representing changes in temperature in this lower receiving portion of the hopper. When the relatively cool material from the container moves into the lower receiving portion of the hopper, the temperature sensor will detect a drop in temperature. A controller is connected to the temperature sensor and is responsive to the output signal for providing an indicator signal in response to a predetermined change in the temperature in the lower material receiving portion of the hopper. This indicator signal may be used to operate an operator perceptible indicator device, such as a light on a control panel, to inform the operator that the container may be removed from the hopper. Other alternatives to sensing temperature drops include sensing power output of the melting grid or other heating device when the slug of material has moved out of the container and has begun to be melted by the grid or other heating device.

It will be appreciated from the foregoing and from the more detailed description to follow that the present invention provides precise and early detection and indication of the movement of material, such as hot melt adhesive, from a container contained within a hopper. The invention therefore allows the container to be removed from the hopper immediately after the material contained therein has been released or become detached from the inner walls of the container as by a melting process performed by the hopper.

These and other objects and advantages of the present invention shall become apparent from the following detailed description of the preferred embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description given above and a detailed description given below, serve to explain the principles of the invention.

DETAILED DESCRIPTION OF THE PREFERRED EMBODIMENTS

Figure 1:
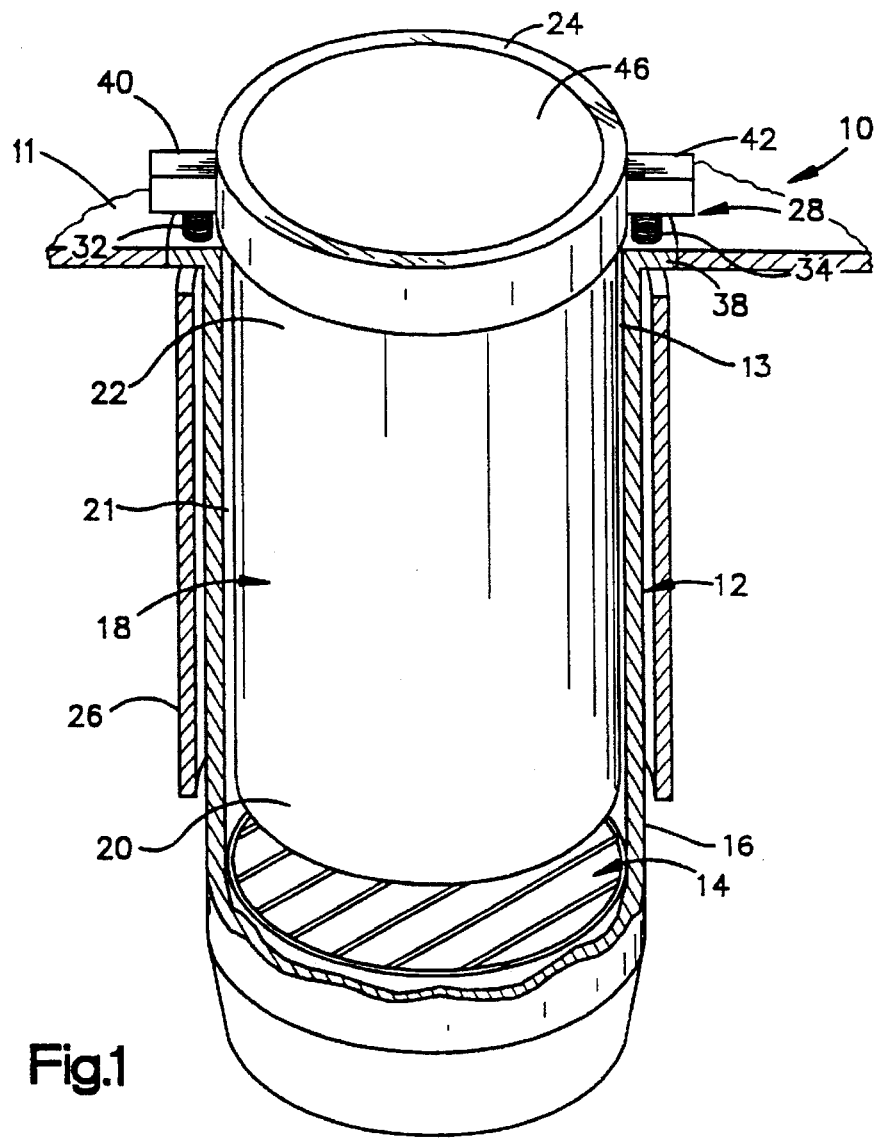
FIG. 1 is a schematic sectional view of a hot melt adhesive apparatus illustrating a first embodiment of the present invention.

With reference to FIG. 1, there is shown an apparatus 10 in accordance with the first embodiment of this invention supply hot melt adhesive to a dispensing location. Apparatus 10 includes a housing 11 with a generally cylindrical hopper 12 having an open upper end 13 and a lower portion 16. An adhesive receiving support member comprising a melting grid 14 is mounted in the lower portion 16 of hopper 12. The melting grid 14 contains one or more heating elements (not shown) which heat grid 14 to melt the hot melt adhesive in contact therewith in a known manner. Other conventional components of apparatus 10, such as a reservoir and pump for respectively receiving and pumping the melted adhesive, have been left off FIG. 1 for clarity.

Upper portion 13 of hopper 12 receives a container 18 of hot melt adhesive, and lower portion 16 receives the adhesive from container 18 upon its release. As is typical in large scale applications, container 18 may be as large as a 55 gallon drum or could be a relatively small pail. Container 18 is suspended in the hopper 12 with an open lower end portion 20 facing downward. The open lower end portion 20 is preferably spaced above the lower adhesive receiving portion 16 of the hopper 12 and the melting grid 14 for a reason to be described below. Further, hopper 12 may be sized such that there is an annular space 21 formed between the walls of the container 18 and the hopper 12. However, as will be readily appreciated by those skilled in the art, hopper 12 may also be sized to snugly receive container 18. To suspend container 18 in hopper 12, an upper end portion 22 of the container 18 is engaged by an annular clamp ring 24.

Typically, the hot melt adhesive is held in the container 18 in the form of a slug even though the open lower end portion 20 of the container is open. To promote movement of hot melt adhesive out of the container 18 and onto the melting grid 14, at least one heater 26 is provided to heat peripheral portions of the hot melt adhesive in the container 18. Heater 26 is shown as cylindrical in FIG. 1 but may also comprise a plurality of band heaters (FIG. 5) mounted about hopper 12, or may include cartridge heaters or other known heating devices. A lid heater (FIG. 5) may also be provided in the embodiment of FIG. 1 to heat the upper end wall 46 of container 18.

As the hot melt adhesive is heated in the container 18, a layer of molten or softened adhesive forms adjacent the inner side surface and the relative upper surface of the container 18. The layer of molten or softened adhesive allows the slug of adhesive to fall downward under the force of gravity through the open lower end portion 20 of container 18 and onto melting grid 14. To aid in promoting the downward movement of the adhesive, one or more openings may be formed in the upper end wall 46 of the container 18 to vent the upper end portion 22. As will be readily appreciated by those skilled in the art, a receiving member other than the melting grid 14 could be provided beneath the container 18 to receive the slug of hot melt adhesive. Such a receiving member could compromise one or more shelves or supports (not shown) projecting inwardly from the sides of hopper 12 that would serve to slow down the slug of adhesive as it falls and, for example, prevent damage to the melting grid 14.

As soon as the body of adhesive is received on the melting grid 14, the container 18 may be removed from the hopper 12. This is because, as the grid 14 melts the adhesive, molten adhesive may accumulate and move upward into the annular space 21 between the cylindrical inner side surface of the hopper 12 and the cylindrical outside surface of the container 18. If the container 18 has not been removed before this has occurred, the molten adhesive will adhere to the container 18. When the container 18 is subsequently removed, the molten adhesive may drop onto the apparatus 10, the floor, or may run down the outer surface of the container after it has been righted. All of this impedes subsequent handling and disposal of container 18.

In accordance with this first embodiment of the invention, an indicator assembly 28 provides a visual indication to an operator when the hot melt adhesive moves downward from the container 18 and is received on the melting grid 14 in the lower portion 16 of hopper 12.

As shown in FIG. 1, the indicator assembly 28 includes apparatus for yieldably supporting the container 18, such as a plurality of upwardly facing compression springs 32, 34 disposed between an outwardly extending annular flange 38 on the upper end 13 of the hopper 12 and arms 40, 42 which extend radially outward in opposite directions from the clamp ring 24. Thus, spring 32 is supported on flange 38 and is compressed by arm 40 which extends outward from clamp ring 24. Similarly, spring 34 is supported on flange 38 and is compressed by arm 42 which extends outward from clamp ring 24. Accordingly, springs 32, 34 urge the clamp ring 24 and container 18 upwardly, that is, in a direction away from the melting grid 14.

Clamp ring 24 firmly grips the upper end portion 22 of the container 18 to support the container 18 above the melting grid 14. The clamp ring 24 and/or arms 40, 42 may be provided with suitable openings for engagement by a material handling apparatus, such as a fork lift truck or a hoist for use in inserting and removing the container 18.

When the container 18 is first suspended in the hopper 12, and prior to movement of the hot melt adhesive from the container 18 downward into the lower portion 16 of hopper 12, the combined weight of the container 18 and hot melt adhesive held therein compresses springs 32, 34. However, when at least a portion of the hot melt adhesive has been received into lower portion 16 and onto melting grid 14, the weight supported by hopper 12 through clamp ring 24 decreases. This decrease in suspended weight allows the springs 32, 34 to expand and urge the clamp ring 24 and container 18 upward. This increases the distance between flange 38 and arms 40, 42 on clamp ring 24.

The increased spacing between the flange 38 and the arms 40, 42 provides an indication that at least a portion of the weight of the hot melt adhesive has been transferred from the container 18 to the melting grid 14. Although the springs 32, 34 urge the container 18 upwardly when any significant portion of the adhesive has left the container 18, because the container is heated by heater or heaters 26, substantially the entire contents of the container 18 will generally drop onto the melting grid 14 at the same time. Thus, as soon as the distance between the arms 40, 42 and the flange 38 increases, an operator will realize that it is time to withdraw the container 18 from the hopper 12. Accordingly, the upward movement of the container 18 provides notification to the operator that the adhesive has been released from the container 18 and enables the operator to remove the container 18 from the hopper 12 before the slug of hot melt adhesive becomes fully molten. As mentioned above, this prevents back up of adhesive around the outside of container 18. As the container 18 is preferably spaced above the melting grid 14, the operator is provided with some time to remove the container 18 before the hot melt adhesive may build up around the outer side surface. It should be understood that the entire hopper 12, heater 26, melting grid 14, and clamp ring 24 may be enclosed by a housing having a window through which the flange 38 and at least one of the arms 40, 42 is visible to an operator.

As will be readily appreciated, other spring mechanisms may be used for providing an indication that the hot melt adhesive has been released from the container 18. For example, clamp ring 24 may be suspended from a ring that is supported by a plurality of springs to annular flange 38. Thus, the clamp ring 24, and not just the arms 40, 42 may be supported by the springs. Other variations will be readily apparent to those skilled in the art.

Figure 2:
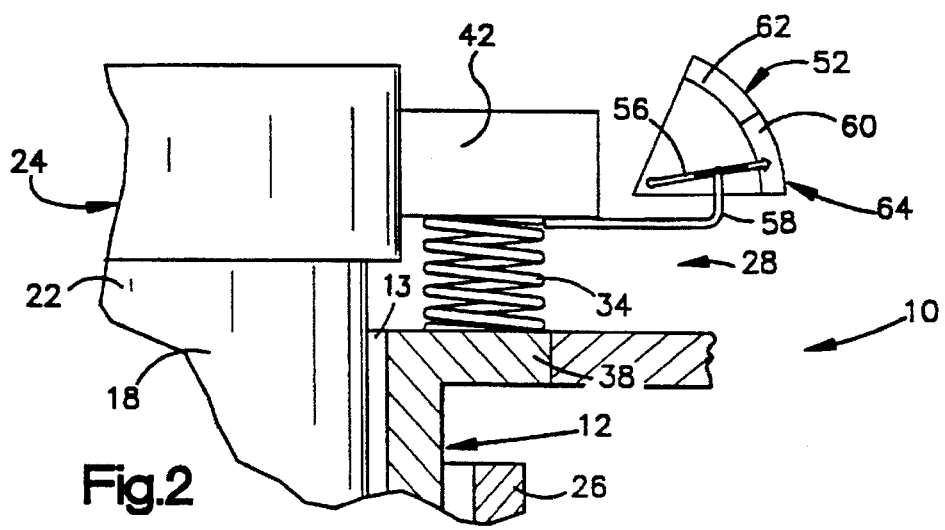
FIG. 2 is an enlarged fragmentary schematic sectional view of the hot melt adhesive apparatus of FIG. 1, illustrating one type of operator perceptible indicator.

As shown in FIG. 1, the indicator assembly 28 relies upon upward movement of the container 18 and the clamp ring 24 to indicate to an operator that the hot melt adhesive has moved downward from the container 18 into the lower portion 16 of hopper 12 and onto the melting grid 14. As shown in FIG. 2, however, the indicator assembly 28 may include perhaps a more easily perceived operator indicator mechanism 52 to provide a signal to the operator indicating when the hot melt adhesive has moved downward through the open lower end portion 20 of the container 18. In this aspect of the first embodiment, indicator mechanism 52 provides a visually perceptible pointer 56 that is pivoted in a counterclockwise direction (as viewed in FIG. 2) by a connector arm 58 which is connected to the top of spring 34. Upward movement of the top of spring 34 when the slug of hot melt adhesive drops out of the container 18 moves the pointer 56 upward (as shown in FIG. 2) from an initial area 60 to a second area 62 of a scale 64 which mounts pointer 56. As soon as pointer 56 moves from area 60 to area 62 of scale 64, an operator will realize that the hot melt adhesive has dropped downward from the container 18 and into the lower portion 16 of hopper 12.

It should be understood that although only a single spring 34 has been shown in FIG. 2, a second spring, corresponding to the spring 32, is associated with the clamp ring 24. However, the second spring could be omitted and the clamp ring 24 could be pivotally supported on the hopper 12 at a location diametrically opposite from the spring 34, if desired. Further, the entire clamp ring 24, heater 26, and hopper 12 could be enclosed by a housing. The indicator mechanism 52 would be visible through a window in the housing or could be disposed outside of the housing. As will be readily appreciated by those skilled in the art, indicator mechanisms or devices having constructions different from the specific construction of mechanism 52 could be associated with the clamp ring 24 if desired. Specifically, any device that can detect and indicate the change in displacement of the container 18, or the change in weight of either the container 18 or hopper 12, may be used without departing from the spirit or scope of the present invention.

Alternatively, other force response elements for supporting the container 18 may be used in this first embodiment.

Figure 3:
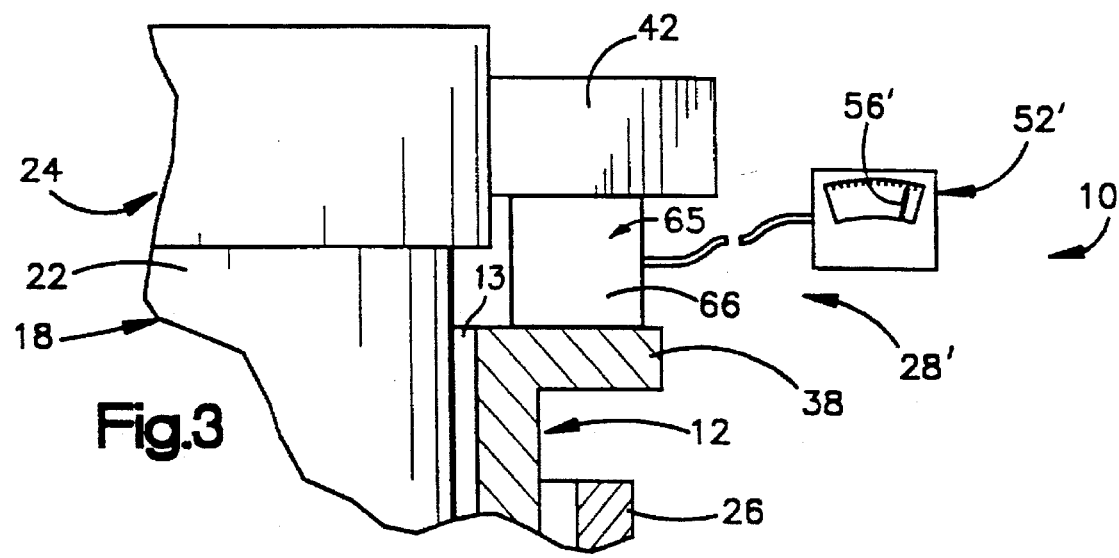
FIG. 3 is an enlarged fragmentary schematic sectional view similar to FIG. 2, but utilizing an indicator comprising a load cell rather than a spring.

For example, and as shown in FIG. 3, an electrical indicator device 28' comprising one or more a force responsive elements 65, such as a load cell 66, is disposed between the flange 38 at the upper end 13 of the hopper 12 and the arm 42 on the clamp ring 24 to support the container 18. The load cell 66 is electrically connected to an indicator mechanism 52' to provide a signal indicative of the weight suspended by the clamp ring 24 from the upper end 13 of the hopper 12.

For example, the indicator device 52' may be adapted such that, when the weight bearing on load cell 66 is decreased, an indicator member or pointer 56' pivots toward the left (as viewed in FIG. 3) to indicate that at least a portion of the hot melt adhesive has moved downward through the open lower end portion 20 of the container 18 and onto the melting grid 14. Although only a single load cell 66 has been shown in FIG. 3 between the flange 38 and the clamp ring arm 42, it should be understood that a second load cell may be provided between the flange 38 and a second arm on the clamp ring 24. Other variations will be apparent to those skilled in the art. For example, movement due to release of material from container 18 could be converted to an electrical signal such as by a limit switch or linear actuator and this electrical signal may be used to drive an indicator such as a light to signal to an operator that the container may be removed.

Figure 4:
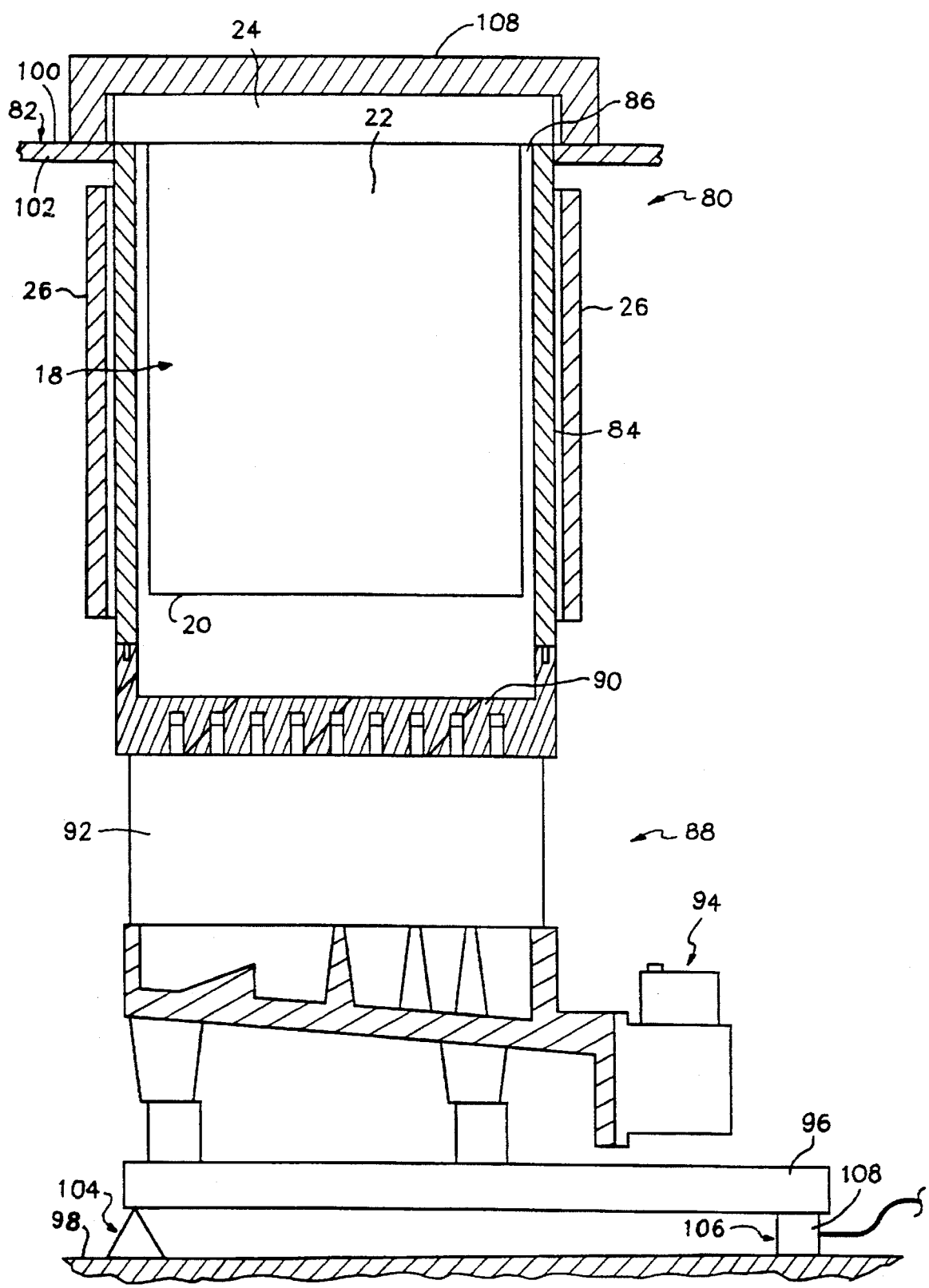
FIG. 4 is a schematic sectional view of a hot melt adhesive apparatus constructed in accordance with a second embodiment of the present invention.

With reference to FIG. 4, and in accordance with a second embodiment of the invention, an apparatus 80 for supplying hot melt adhesive from container is provided having a housing 82 with a hopper 84 disposed within. In this embodiment, the increase in weight of the hopper 84, rather than the decrease in the weight of the container 18, is detected and signaled to the operator so that container 18 may be removed leaving the hot melt adhesive behind in hopper 84.

The hopper 84 is sized to receive a container 18 of hot melt adhesive therein and includes an open upper end 86 and a lower end 88. The lower end 88 includes a melting grid 90 and a lower reservoir 92 to hold liquid adhesive which has passed through grid 90. The reservoir 92 is connected in fluid communication with a pump and manifold assembly 94. Lower end 88 of hopper 84 is secured to a platform 96, which is suspended on the base 98 of housing 82 in a manner to be described below.

The top 100 of the housing 82 includes a surface 102 above the hopper 84 which supports clamp ring 24. As in the first embodiment, clamp ring 24 grips the upper end portion 22 of the container 18. Also as in the first embodiment, the open lower end portion 20 of the container 18 is preferably suspended above the lower end 88 of the hopper 84. But, in this second embodiment, the container 18 is suspended from the housing 82 and not the hopper 84. Accordingly, the weight of the hot melt adhesive is not supported by the hopper 84 until the hot melt adhesive leaves the container 18 and is received on a support, i.e., grid 90, mounted in lower portion 88 of the hopper 84.

Hopper 84 is shown yieldably supported on the base 98 of housing 82 by a fulcrum 104 and force responsive element 106. Thus, the force responsive element 106 is able to detect the increased force on the hopper 84 due to the movement of hot melt adhesive from container 18 onto supporting grid 90. The force responsive element 106 can be any device that responds to changes in force such as a spring or load cell 108 as shown. Further, as will be readily appreciated by those skilled in the art, the lower portion 88 of the hopper 84 may be suspended on the base 98 of housing 82 solely by one or more of the force responsive elements 106, thereby eliminating the fulcrum, without deviating from the spirit or scope of the present invention.

As the hot melt adhesive is heated in the container 18 by heater or heaters 26, a layer of molten adhesive forms adjacent a cylindrical inner side surface of the container 18 as well as the relative upper surface of the inverted container 18. The slug or body of adhesive then drops downward onto the melting grid 90 in the lower end 88 of hopper 84. When the slug or body of adhesive is in the container 18, the weight of the adhesive is carried by the housing 82 and is not supported by the hopper 84. When the slug or body of adhesive drops downward onto the melting grid 90, however, the weight of the adhesive is transferred to grid 90, reservoir 92, platform 96 and finally to the force responsive element 106. This change may be detected by any of the indicator mechanisms discussed above and relayed to the operator to indicate that the container 18 may be removed.

Figure 5:
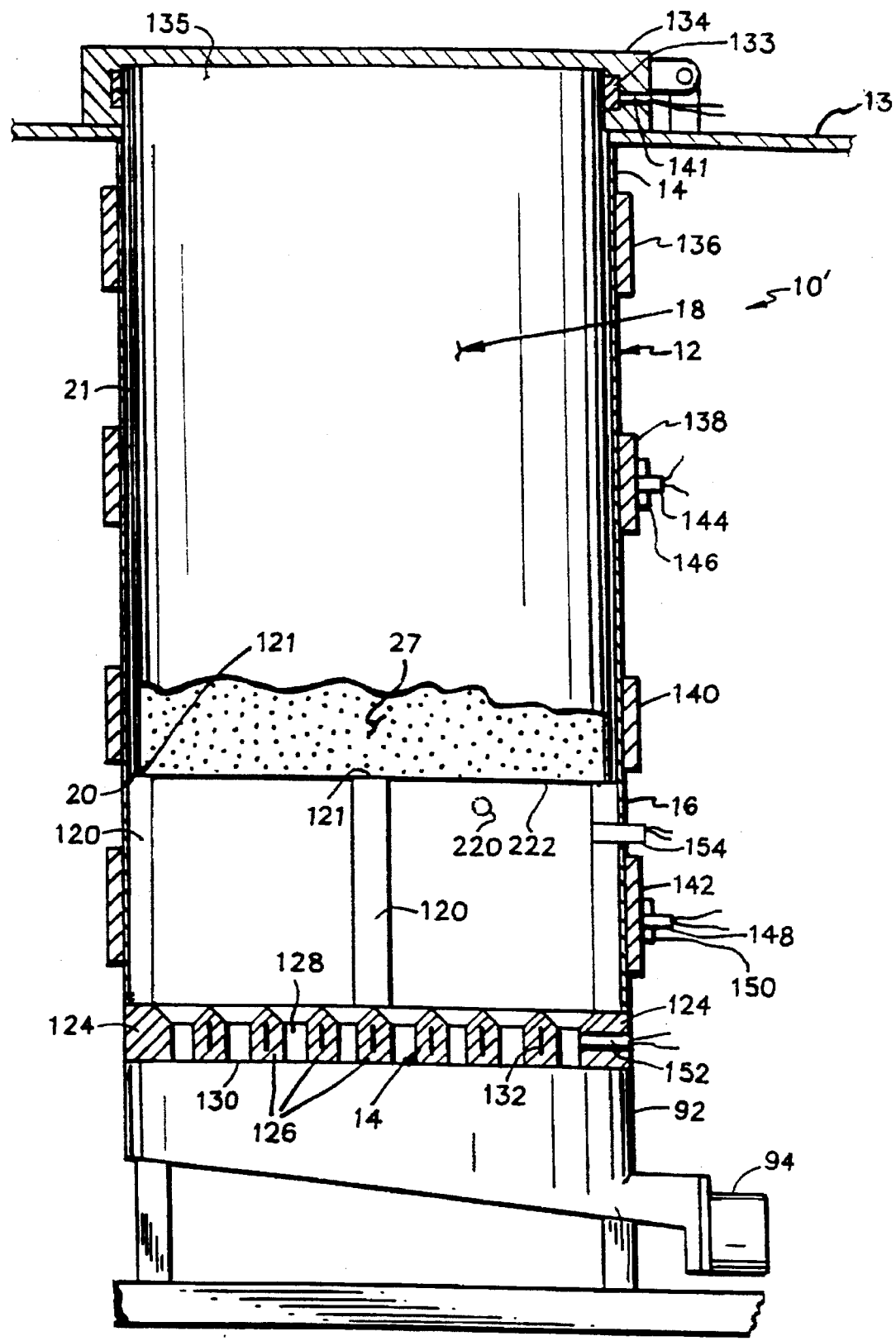
FIG. 5 is a schematic sectional view of a hot melt adhesive apparatus constructed in accordance with a third embodiment of the present invention.

FIG. 5 illustrates a hopper type dispenser unit 10' including an alternative embodiment for detecting when a slug 27 of adhesive drops from the container 18 into a lower portion 16 of the hopper 12. The container 18 is supported by a plurality of elongated drum support members 120 which extend upwardly from a melting grid 14 and radially inwardly from the lower portion 16 of hopper 12. Upper surfaces 121 of each support member 120 receive a peripheral edge or rim portion of the container 18 at the open end 20. Support members 120 extend radially inwardly past the edge or rim of container 18 such that they each support the adhesive slug 27 and prevent the premature free falling of slug 27 from container 18 so as not to damage grid 14. Peripheral supports 124 disposed about melting grid 14 receive the steel support members 120 thereon and bear the weight of the inserted container 18 and adhesive slug 27. Alternatively, container 18 may be supported at the top of hopper 12 such as in the manner shown in FIG. 1 or some other manner.

Melting grid 14 comprises a plurality of intersecting heated grid members 126, 128 which define openings 130 therebetween for allowing melted or liquified hot melt adhesive material to pass through. Grid members 126, 128 may each include heating elements 132 therein, although only the heating elements 132 of members 126 are shown in the drawings. A reservoir 92 is disposed beneath melting grid 14 for receiving the liquid hot melt adhesive material which passes through melting grid 14. A pump and manifold assembly 94 is provided as well for pumping liquid adhesive from reservoir 92. For the purposes of maintaining this hot melt adhesive in a liquid state suitable for dispensing, conventional heating elements (not shown) may be provided within reservoir 92.

A band heater 133 is contained within lid 134 and surrounds the bottom 135 of the inverted container 18. Band heaters 136, 138, 140 are spaced longitudinally along the upper portion 14 of the hopper 12 so as to be disposed adjacent to the body of container 18 generally between its ends 20, 135. Band heater 142 is mounted about the lower portion 16 of hopper 12 generally adjacent the melting grid 14 and functions to heat the lower portion 16 and, to a lesser extent, steel support members 120 by conduction through hopper portion 16.

A first temperature sensor or transducer 141 is mounted within lid 134 in contacting relationship with band heater 133 to measure the temperature in an upper heating zone of hopper 12 immediately adjacent lid 133. A second temperature sensor or transducer 144 is mounted within a conductive block 146 that in turn is mounted to the band heater 138. The temperature sensor 144 measures the temperature within a heating zone in the upper portion 14 of the hopper 12 that is heated by band heaters 136, 138, 140. A third temperature sensor or transducer 148 is mounted within a conductive block 150 that in turn is attached to the band heater 142. The temperature sensor 148 measures the temperature within a heating zone in the lower portion 16 of the hopper 12 that is heated by the band heater 142. A fourth temperature sensor or transducer 152 is mounted within the grid 14 and measures the temperature of the grid 14 which is heated by heaters 132. A fifth temperature sensor 154 is mounted within one of the container supports 120 and measures the temperature of the container support. Preferably, the temperature sensors 141, 144, 148, 152, 154 are standard nickel resistance temperature device ("RTD") sensors having a 120 ohm resistance which are commercially available from Minco of Minneapolis, Minn.

Figure 6:
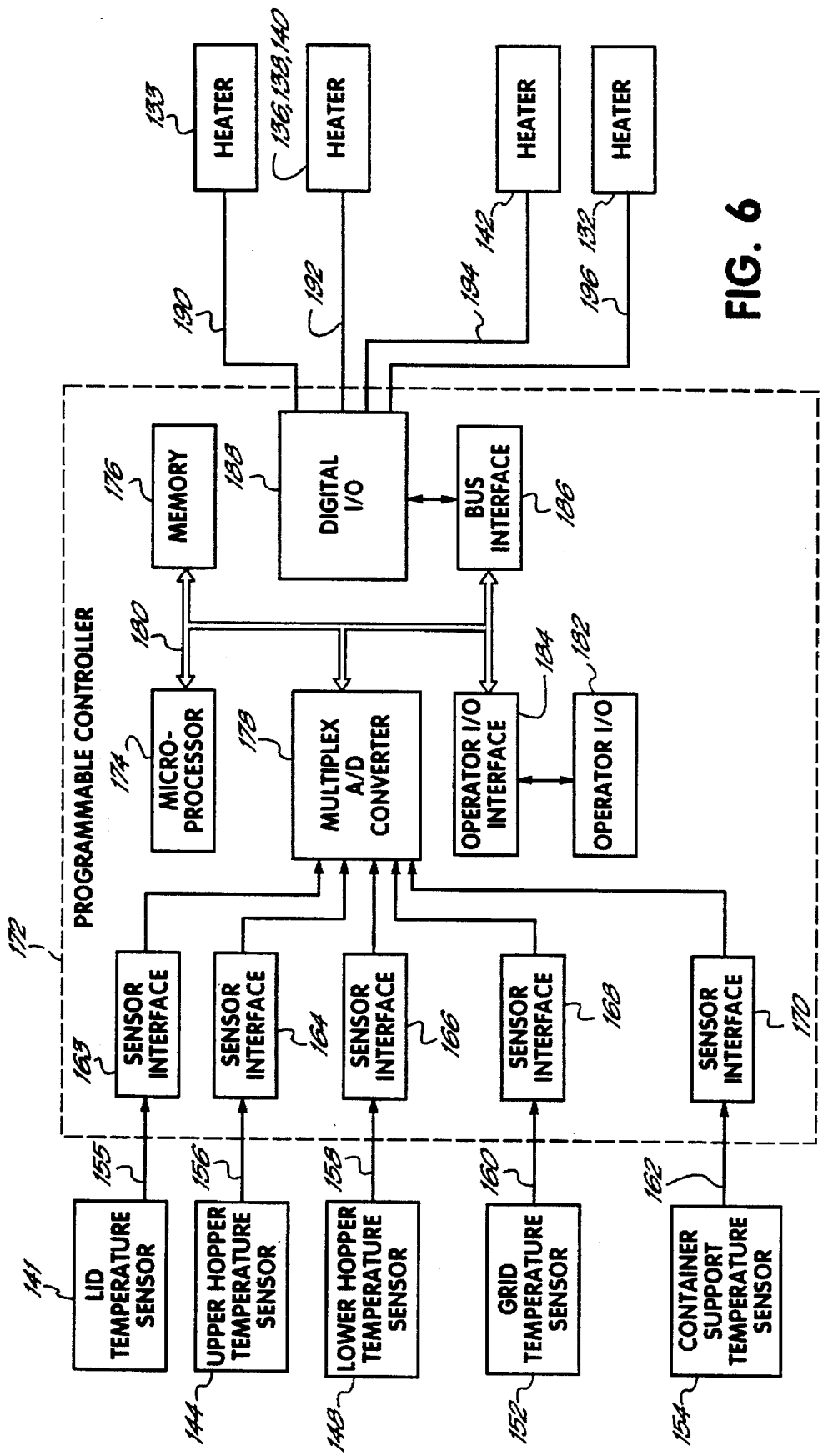
FIG. 6 is a schematic block diagram of a control utilized in the third embodiment of the invention for detecting slug movement from the container by way of temperature or energy detection control; and, FIG. 7 is a flow diagram of a slug drop detection routine executed by the control of FIG. 6.

As shown in FIG. 6, the temperature sensors 141, 144, 148, 152, 154 provide temperature feedback signals on outputs 155, 156, 158, 160, 162 respectively, which are connected to temperature sensor interfaces 163, 164, 166, 168, 170, respectively, within a programmable controller 172. Preferably, the sensor interfaces 163, 164, 166, 168, 170 are RTD interfaces. The controller 172 includes a microprocessor 174 that executes programs or routines stored in memory 176. At appropriate times, as determined by operating programs in memory 176, the microprocessor 174 samples a multiplexing analog digital (A/D) converter 178. With successive samples, the multiplexing A/D converter 178 sequentially reads the values-of analog signals from of the temperature sensors 141, 144, 148, 152, 154 which are processed by the respective interface 82, 84, 86. The analog values representing temperature are converted by the A/D converter to corresponding digital representations of temperature that are transferred over the bus 180 and stored in memory 176. The memory 176 also contains various temperature set point values for the different heating zones within the hopper 12.

The controller 172 provides a closed loop control of temperature by executing a known proportional, integral, derivative ("PID") control using the temperature set point values stored in the memory 176 and the temperature feedback signals which are sensed by the temperature sensors 141, 144, 148, 152. The programmable controller 172 produces output signals through the bus interface 186 and digital I/O 188 over respective outputs 190, 192, 194, 196 to turn ON or OFF the various heaters 133, 136, 138, 140, 142 and 132 in order to maintain the temperatures in heating zones equal to the desired temperature set point values.

Figure 7:
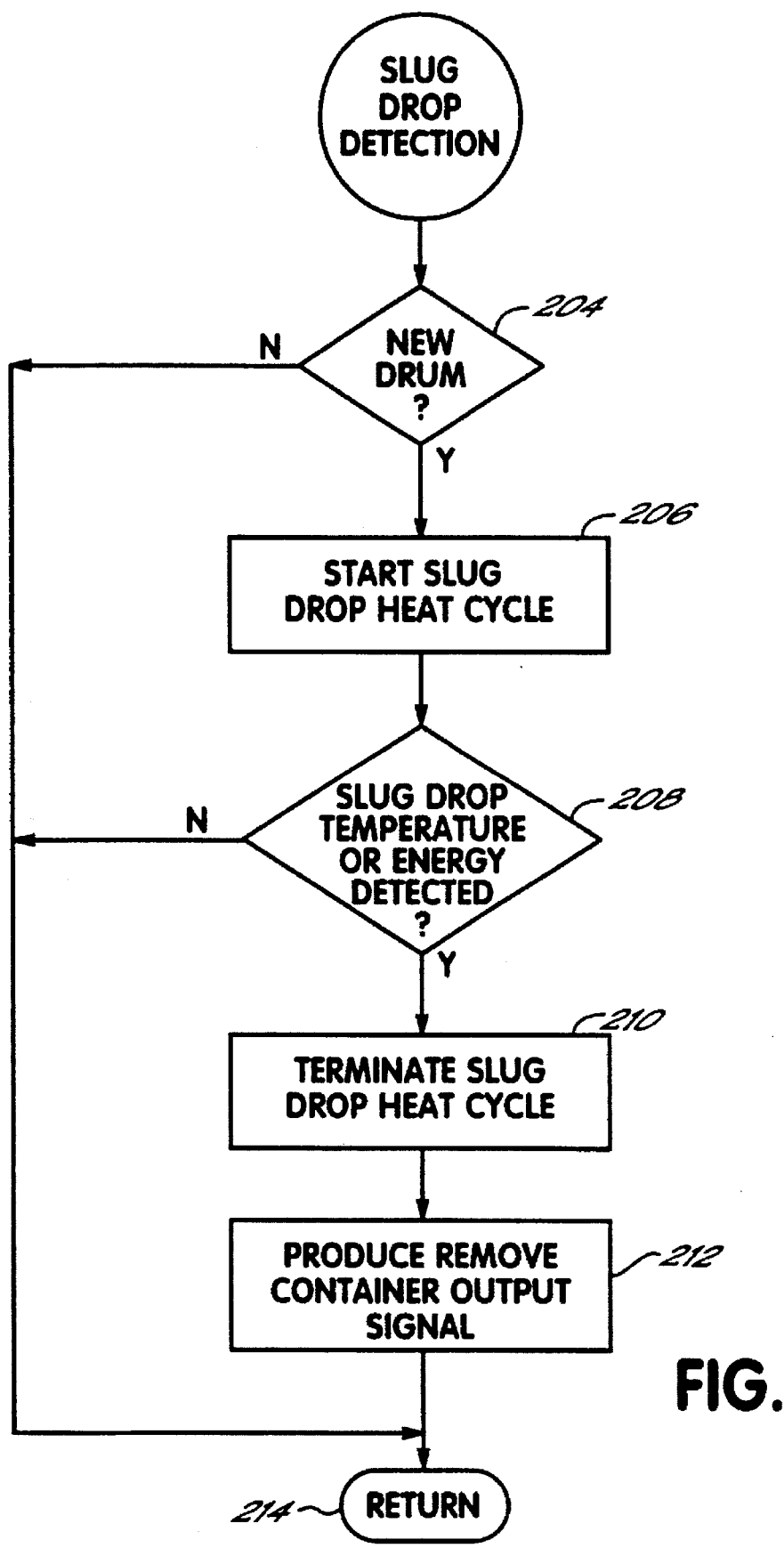

FIG. 7 illustrates a hopper heater control routine or program that is stored in the memory 176 and executed by microprocessor 174 at appropriate times during a main operating routein also stored in memory. After the new container 18 is loaded and the lid 134 is closed, the operator actuates a push button or otherwise provides an input to the programmable control via the operator I/O 182 which produces a "new drum" signal over the operator I/O interface 184 that is detected by the microprocessor 174 as indicated at 204 of FIG. 7.

After controller 172 detects the "new drum" signal at 204 indicating that a container 18 has been loaded, the microprocessor 174 at process step 206 activates a "slug drop heat cycle". During this cycle, output signals from digital I/O 188 are provided to at least heaters 133, 136, 138, 140 (FIG. 5). Microprocessor 174 provides output signals on lines 190, 192 to activate the temperature set point values for heaters 133, 136, 138, 140 to a slug drop temperature set point value. The slug drop temperature set point values are selected to quickly melt the outer boundary layer of adhesive within the container 18, thereby loosening the adhesive and allowing it to gradually slide or drop from the container 18.

After a period of time, depending on the adhesive material and the temperature set points chosen to loosen the adhesive from the container, the slug of adhesive 27 will start to drop from its loaded position in the container 18. As the slug 27 slides out of the container 18, it contacts the container supports 120. The container supports 120 are heated by band heater 142. Even though the surface of the slug may be at its melting temperature, the interior of the slug is much cooler. Therefore, as the slug drops onto the container supports 120, and supports 120 penetrate the surface of the slug and contact the lower temperature, less molten material, the temperature of the container supports 120 lowers. The lower temperature is detected by the sensor 154 and is read by the microprocessor 174. The magnitude of the lower temperature will depend, for example, on the location of the sensor 154 in the container support 120 and the position of the sensor 154 relative to the heater 142. Therefore, for any given set of operating conditions, the reduction of the temperature of the container supports 120 caused by contact with the dropping slug of adhesive 27 can be experimentally determined and may, for example, represent approximately a 50° F. drop in temperature. Further, this slug drop container support temperature is input to the controller 172 by any of several known ways and stored in the memory 176.

When the controller 172 activates the slug drop heat cycle at 206, it also starts sampling the output of the temperature sensor 154 and comparing it to the stored slug drop container support temperature. When controller 172 detects that the temperature from the output of the temperature sensor 154 is equal to or below the stored slug drop container support temperature at 208, it terminates the slug drop heat cycle at 210 returning the temperature set points for heaters 133, 136, 138, 140 to their standby mode temperature set point values. The values for the standby temperature set points may be chosen so that the outer surface of the slug does not stick to the walls of the hopper during normal operation. However, the standby temperature set points should also be low enough so that there is no significant melting of the adhesive by the upper hopper heaters 136, 138, 140. Lid heater 133 may be able to be turned OFF as heat in the empty upper area of container 18 is not usually needed. During normal operation, the heater 142 in the lower portion 16 of the hopper 12 may have a temperature set point that is equal to the temperature set point of the grid heater 132. After the slug drop temperature has been detected, the microprocessor 174 then produces a remove container output signal at 212 which may, for example, activate an indicator light (not shown) informing the operator that container 18 should be removed from hopper 12. Each time the slug drop detection routine is executed, the microprocessor returns to a main routine at process step 214. The main routine may be an otherwise conventional operating routine, and as it forms no part of the present invention it will not be described herein.

While the invention has been set forth by a description of the embodiment in considerable detail, it is not intended to restrict or in any way limit the claims to such detail. Additional advantages and modifications will readily appear to those who are skilled in the art. For example, the temperature sensor is shown mounted relatively high in the container support 120 closer to the open end 20 of the container 18. Alternatively, the sensor 154 can be mounted at a lower location in the container support 120 closer to the melting grid 14. Further, instead of being mounted in the container support 120, the temperature sensor can be mounted in a separate block or fin-like element attached to the side wall of the hopper as shown in phantom at 220. As still further alternatives, other sensors may be used which detect a decrease in the grid temperature when a new, relatively cool slug hits the grid, however, this alternative may not be as desirable during an ongoing operation when the remnant of a previous slug is still being melted on the grid.

Further, thermostats can be used instead of the temperature sensors and the PID temperature control loop. Other logic control devices, for example, relay logic can be used instead of the programmable controller to control thermostatically controlled heaters. etc.

With respect to the first and second embodiments, for example, indicator mechanisms 28 and 28' may be directly coupled to a device to automatically remove the container 18. If springs are used, a limit switch could be used to activate an indicator light and/or activate automatic removal of the container 18. Alternatively, if load cells are used, an electronic signal could be generated to initiate the removal.

Thus, the invention in its broadest aspects is not limited to the specific details, representative apparatuses and methods, and illustrative examples shown and described. Accordingly, departures may be made from the details without departing from the spirit or scope of the applicant's general inventive concept.

What is claimed is:

1. An apparatus for liquifying and supplying thermoplastic material from a container, the apparatus comprising:

a hopper having a container receiving space for receiving a container of thermoplastic material and a thermoplastic material receiving space;

a container support for supporting the container of thermoplastic material within the hopper such that an open end of the container faces said thermoplastic material receiving space; and an indicator operatively connected to the hopper and being activated to indicate when the thermoplastic material has moved from the container into the thermoplastic material receiving space so that the container may be removed and the thermoplastic material left within the hopper.

2. The apparatus of claim 1 further comprising a heating system for heating the container of thermoplastic material in said hopper to promote movement of the thermoplastic material from the container and into said thermoplastic material receiving space.

3. The apparatus of claim 1 wherein said container support is connected to an upper end of said hopper for suspending the container of thermoplastic material therein.

4. The apparatus of claim 3 wherein said indicator includes a force responsive element engaging said container support such that the force exerted on said force responsive element by the container is reduced when at least a portion of the thermoplastic material has moved downward through the open end of the container and into said thermoplastic material receiving space.

5. The apparatus of claim 4 wherein said force responsive element is a spring.

6. The apparatus of claim 4 wherein said force responsive element is a load cell.

7. The apparatus of claim 1 wherein said indicator includes a force responsive element connected to a support in said thermoplastic material receiving space, whereby force exerted on said force responsive element increases when at least a portion of the thermoplastic material has moved from the container onto said support.

8. The apparatus of claim 7 wherein said force responsive element is a load cell.

9. The apparatus of claim 1 wherein the indicator includes:

a temperature sensor disposed within the thermoplastic material receiving space and producing an output signal representing changes in temperature in the thermoplastic material receiving space; and a controller responsive to the output signal for providing an indicator signal in response to a predetermined change in temperature in the thermoplastic material receiving space and indicating that the container should be removed from the hopper after thermoplastic material from the container has moved into the thermoplastic material receiving space.

10. The apparatus of claim 9 wherein the hopper includes a container support member and the temperature sensor is connected to the container support member.

11. The apparatus of claim 9 further comprising:

a heater connected to the thermoplastic material receiving space of the hopper; and a controller for selectively turning the heater ON and OFF and producing an indicator signal in response to turning the heater ON, said indicator signal indicating that the container should be removed from the hopper.

12. The apparatus of claim 9 further comprising a melting grid mounted within the thermoplastic material receiving space hopper, wherein the temperature is connected to the melting grid.

13. A method of operating a thermoplastic material melting apparatus including a hopper having a container receiving space and a thermoplastic material receiving space, the method comprising the steps of:

supporting a container of thermoplastic material in said container receiving space and above said thermoplastic material receiving space with an open end of said container facing said thermoplastic material receiving space;

heating the container to promote liquification of the thermoplastic material and downward movement of said thermoplastic material from the open end of said container;

detecting when at least a portion of said thermoplastic material has moved downwardly through the open end of said container and into said thermoplastic material receiving space; and signaling that the thermoplastic material has moved into said thermoplastic material receiving space.

14. The method of claim 13 wherein the apparatus includes a control system and the signalling step further includes generating an output signal in response to detecting when at least a portion of said thermoplastic material has moved downward through said open end of said container and into said thermoplastic material receiving space.

15. The method of claim 13 wherein the detecting step further includes detecting a reduction in force imparted onto said hopper by said container said thermoplastic material has moved from aid container into said thermoplastic material receiving space.

16. The method of claim 15 wherein the signalling step further comprises signalling the reduction of force by a force measuring scale.

17. The method of claim 13 wherein the detecting step further includes sensing a change in weight of said container in response to movement of said thermoplastic material from said container into said thermoplastic material receiving space.

18. The method of claim 13 wherein the detecting step further includes sensing a change in weight of said hopper in response to movement of said thermoplastic material from said container into said thermoplastic material receiving space.

19. A method of operating a thermoplastic material melting apparatus including a hopper having a container receiving space and a thermoplastic material receiving space, the method comprising the steps of:

supporting a container of thermoplastic material in said container receiving space and above said thermoplastic material receiving space with an open end of said container facing said thermoplastic material receiving space;

heating at least a portion of the thermoplastic material receiving space of the hopper to a predetermined temperature;

heating the container to cause thermoplastic material to move out of the container and into the thermoplastic material receiving space of the hopper;

detecting a change in said predetermined temperature in response to the presence of thermoplastic material in a thermoplastic material receiving space; and producing an indicating signal in response to detecting the change in said predetermined temperature.

20. The method of claim 19 wherein the detecting step comprises detecting a drop in said predetermined temperature.

21. The method of claim 20 further comprising the steps of:

turning ON a heater connected with the thermoplastic material receiving space of the hopper in response to detecting the drop in temperature; and producing an indicating signal in response to turning ON the heater for indicating that the container should be removed from the hopper.

22. A method of claim 19 wherein the heating step further includes heating a melting grid mounted in said thermoplastic material receiving space to said predetermined temperature.

* * * * *